Figure 2:
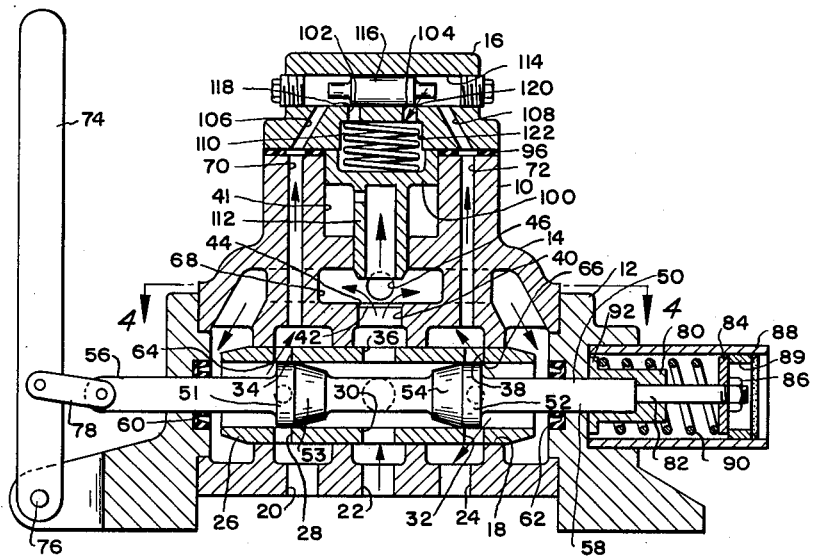

April 14, 1964     W. WAGNER     3,128,789
FLUID CONTROL VALVE

Filed Jan. 9, 1961            2 Sheets-Sheet 1

INVENTOR
WILLIAM WAGNER
BY
Fetherstonhaugh & Co.
ATTORNEYS

United States Patent Office

3,128,789
Patented Apr. 14, 1964

3,128,789
FLUID CONTROL VALVE
William Wagner, 825 Farmleigh Road, West Vancouver,
British Columbia, Canada
Filed Jan. 9, 1961, Ser. No. 81,577
11 Claims. (Cl. 137—596.13)

This invention relates to fluid control valves and particularly to a valve adapted to control both the direction and the rate of flow of fluid in the selected direction therethrough.

Hitherto in applications where it is desired to control both the direction and rate of flow of a fluid, it has been the usual practice to employ a separate flow control valve and a four way direction control valve. The conventional four way fluid control valve known hitherto may, it is true, be used to control both direction and flow, but it is usually extremely difficult with such valves to regulate the fluid flow in such manner that any desired flow between zero and maximum may be maintained in applications where the pressure applied to move the load varied. Usually, with the known four way valves, the position of the valve spool must be altered to varying load pressures if speed control of the load is desired. Thus, the only practical way for affecting the dual control of flow and direction utilized heretofore has been to employ separate pressure compensated flow control as well as direction control valves. With a separate flow control valve and a conventional four way valve, either two manipulations are required to control both direction and flow or complicated mechanical linkage between the four way valve spool and the flow control valve is necessary, the latter usually introducing slack and friction and making the piping more complicated, bulky and costly. In either case, the control is not steady, smooth or accurately repeatable. With the valve according to this invention, the direction and volume of flow are controlled by movement of one element only, which element is conveniently situated near the operator.

It is an object of the invention to provide a directional control valve in which pressure compensated variable flow in both directions is effected by manipulation of a single element, the quantity of flow in both directions being determined by the displacement of this element from its neutral position, regardless of load variations.

It is a further object of the present invention to provide a valve which allows sensitive and accurate positioning of a load, enables the flow to be reversed without passing through a large dead spot in the neutral position of the valve and in which the load is slowly accelerated and slowly decelerated as the valve spool leaves or approaches the neutral position.

Another object of the invention is to provide a valve which can be operated to produce gradual acceleration or deceleration of the load regardless of load or load changes encountered thereby minimizing shock, noise, vibration and other undesirable effects when moving, starting or stopping large masses at high speed.

A still further object of the invention is to provide a valve in which the load speed is independent of the fluid supply as long as the latter is larger than the volume delivered to the load.

In accordance with these objects the present invention contemplates the provision of a fluid flow metering and directional control valve comprising a housing formed with a valve cylinder having a pair of longitudinally spaced load ports and a supply port intermediate said load ports for connection to a high pressure fluid source, an adjustable flow control element communicating with said cylinder through said supply port and said load ports, and a valve spool movable axially of said cylinder for selectively connecting said supply port to one of said load ports whereby the fluid pressure at the supply port and the selected load port is applied to opposite sides of the flow control element, said flow control element responsive to variations in the fluid pressure at the supply port and the selected load port to maintain a substantially constant pressure difference therebetween thereby to maintain a substantially constant flow rate to the selected load port for a selected valve spool position.

Other features which may be included in accordance with the invention will be described hereinafter and referred to in the appended claims.

Figure 1:
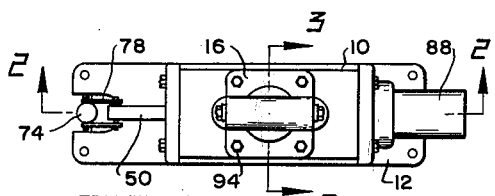
Figure 3:
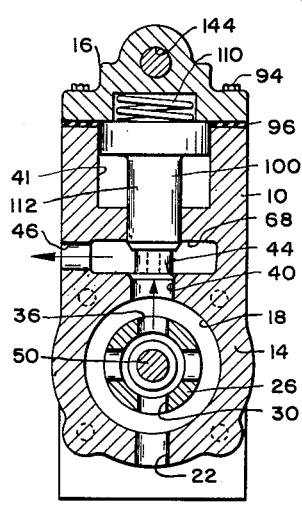
Figure 4:
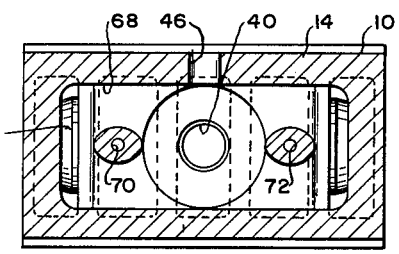
Figure 5:
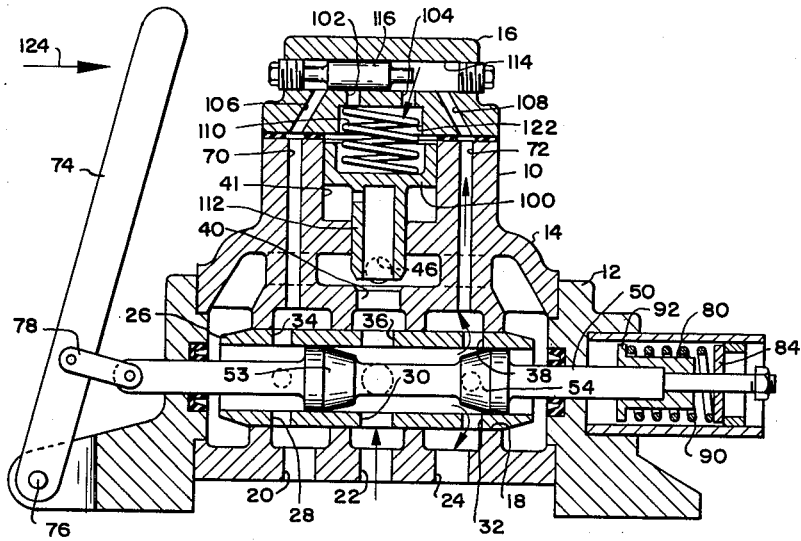

The invention will now be described in detail, reference being had to the accompanying drawings which show one embodiment of the invention and in which:

FIGURE 1 is a top plan view of the valve according to this invention,

FIGURE 2 is a sectional view on the line 2—2 of FIGURE 1 showing the valve in neutral position with the fluid flowing, FIGURE 3 is a sectional view on the line 3—3 of FIGURE 1, FIGURE 4 is a sectional view on the line 4—4 of FIGURE 2, and FIGURE 5 is a sectional view similar to FIGURE 2 but showing the valve in a position intermediate the neutral position and one extreme end position whereat one load port is connected to the supply port and one to the exhaust or return port.

Referring to the drawings, the valve includes an integral housing generally designated 10 consisting of an annular base section 12 and a body section 14, and a cover member 16. The housing 10 is provided with a horizontal bore 18 having spaced-apart load ports 20 and 24 and a pressure or supply port 22 formed intermediate said load ports. A sleeve 26 is inserted in the bore 18 and is provided with pairs of ports 28 and 34, 30 and 36 and 32 and 38 aligned with the ports 20, 22 and 24, respectively. A vertical passage 40 extends upwardly from the aligned ports 30 and 22 and is provided at its upper end with an opening 42 having an annular seat 44. Opening 42 communicates with the bore 18 through port 36 formed in sleeve 26. The valve seat 44 is preferably of the sliding type. A return tank of exhaust port 46 extends from the passage 40 at a point above the seat 44 and communicates with a fluid tank (not shown) when the seat 44 is open.

The sleeve 26 defines a valve cylinder and mounted therein is a slidable solid valve spool 50 formed medially thereof with opposed spaced-apart lands 51 and 52 and having cylindrical stem portions 56 and 58 at either end thereof. The valve spool 50 is journalled at each end into the upstanding peripheral wall of the base section 12 of housing 10. Suitably fluid tight seals 60 and 62 prevent leakage of fluid between the spool and the valve housing to the outside of the housing.

In the neutral position with the valve as shown in FIGURE 2, small by-passes 64 and 66 are provided between the cylindrical lands 51 and 52, respectively, of spool 50 and the ports 34 and 28 and 38 and 32, respectively, in the sleeve 26. These by-passes 64 and 66 communicate with the exhaust port 46 through the horizontal passageway 68 and with vertical passages 70 and 72 formed in the valve body and with the load ports 20 and 24.

An operating lever 74 is pivotally attached to the valve base 12 by means of a pin 76 and is connected to one end of spool 50 by means of a link 78. The other end of spool 50 extends through a collar 80 and is formed with a reduced portion 82. A disc 84 is slidably mounted on reduced portion 82 and maintained in position thereon by a nut 86 threadedly engaged with the outer end of portion 82. The disc 84 is mounted for axially sliding movement within a cylindrical cap 88 secured to and projecting outwardly from the base section 12 of housing 10. The outward movement of spool 50 and disc 84 through the cap 88 is limited by a stop member 89 secured within cap 88 adjacent the outer end thereof. A spring 90 is mounted around the end of spool 50 with one end thereof engaging the flange 92 of collar 80 and the other end thereof engaging the disc 84. Spring 90 is normally effective to bias the valve spool 50 to the neutral position in which, as shown in FIGURE 2, it is effective to seal off the ports 34 and 38 and consequently load ports 20 and 24 apart from the small by-passes 64 and 66 referred to in the foregoing.

The valve cover 16 is positioned on top of the body section 14 of housing 10 and secured in position thereon by means of bolts 94. A fluid tight gasket 96 is inserted between the cover member 16 and the valve body 14. The cover 16 forms with the upper part of body section 14 a chamber 41 in which a flow control piston 100 operates. The cover 16 is also provided with flow passages 102 and 104 and passages 106 and 108 communicating with the vertical by-pass passages 70 and 72. The piston 100 is mounted for axial sliding movement within the chamber 41 and is biased by a spring 110 towards the annular seat 44 at the opening 42 formed in the upper end of passage 40. This spring loading on piston 100 is effective to urge the hollow stem 112 of the piston towards seat 44 thereby to close off the opening 42 and interrupt the communication between exhaust port 46 and supply port 22. A horizontal passage 114 provided in cover 16 forms a cylinder in which a shuttle valve 116 is mounted for axially slidable movement thereof. In the neutral position of the valve, the positioning of the shuttle 116 relative to the flow passages 102 and 104 is such as to provide small by-passes 118 and 120 between the spring chamber 122 and passage 114 enabling fluid passing up or down the vertical passages 106 and 108 to flow into or out of the spring chamber 128.

In operation of the valve, supply port 22 and exhaust port 46 are connected to a pump and tank (not shown) respectively and load ports 20 and 24 may be connected, for example, to the opposite sides of a double acting cylinder, motor or the like (not shown).

With the valve in the neutral position as shown in FIGURE 2, pressure fluid entering supply port 22 acts on the piston 100 to raise the latter against the loading of spring 110 to allow the fluid to pass through opening 42 directly into exhaust port 46. In this position, the flow control piston 100 assumes its fully open position since at this time the spring 110 is compressed by the fluid pressure at port 22 and in passage 40 whilst the spring chamber 122 is connected to exhaust port 46 through the by-passes 118 and 120 at shuttle valve 116 and the vertical passage 70 and 72. Also in this position both of the cylinder outlet ports 34 and 38 are connected to exhaust port 46 through the by-passes 64 and 66 at the cylindrical lands 51 and 52 of valve spool 50 and through passageway 68. In this neutral position, the fluid will flow through the valve as long as the inlet pressure exceeds the spring loading on piston 100.

When it is desired to cause the fluid to flow through one of the load ports, say port 24, the valve spool 50 is moved in the direction of arrow 124 by suitable movement of lever 74. With the valve spool moved in this manner, conditions are as shown in FIGURE 5 which shows the valve in a position intermediate neutral position and one extreme load position. In this position, ports 20, 28 and 34 are open to tank, and ports 36 and 30 are open to ports 38 and 32. With the valve in this position, part of the fluid entering through ports 22 and 30 flows through passage 40 to tank and the other part flows through into ports 38 and 32 and thence to port 24. The shuttle valve 116 is moved to the extreme left as shown in the drawings by virtue of the pressure of the fluid in the passage 72. With the shuttle valve 116 in this position, it is effective to close port 102 thereby disconnecting this port from passage 106, exhaust port 46 and tank. Under the influence of the pressure fluid at load ports 38 and 32 which is transmitted through passages 72 to the spring chamber 122, the flow control piston 100 descends and assumes a position whereat the pressure at supply port 22 which is applied to the lower side of piston 100 is equal to the pressure at load port 24 which is applied to the upper side of piston 100 via ports 32 and 38 and passages 72, 108, 114 and 104, plus the pressure exerted by spring 110. This reduces the amount of fluid directed through passage 40 and exhaust port 46 to tank and directs this same amount of fluid to port 32 and thence through port 24 to the one side of the load. The other side of the load returns fluid through ports 20, 28 and 46 to tank. If the load resistance increases there will be a pressure rise in supply port 22 and load port 24, which will have a tendency to cause more fluid to escape via spill passage 40 to tank but at the same time the pressure on the upper side of piston 110 increases, with the result that spring 110 moves flow control piston down, reducing the spill opening to tank and re-establishing the original pressure difference between the upper and lower parts of flow control piston, so that despite the higher pressure at the supply side of the spill passage substantially the same amount of fluid escapes to tank as before and substantially the same flow as before goes to load port 24. A slight difference in flow is caused by the slight difference in spring pressure at the new position of flow control piston 100. The arrangement is such, therefore, that with the valve spool 50 left in this position, there is a practically constant flow of fluid into port 32 irrespective of the load pressure encountered. In other words, when valve spool 50 is moved to a position to connect either load port 20 or 24 to supply port 22, the flow through the load port remains substantially constant regardless of variations in the pressure at the load port owing to changes in the load. The reason for this is that piston 100 shifts in accordance with variations in the pressure at the load port (valve 50 remaining stationary) in order to increase or decrease the by-pass flow through exhaust port 46, thereby maintaining the substantially constant flow through the load port. When the valve spool 50 is moved to the extreme end position, i.e. to the extreme right as viewed in the drawings, the pressure differential between ports 36 and 38 is reduced to a minimum due to the fact that less throttling takes place at these ports. Under these conditions, the spring 110 is effective to shift piston 100 to its lowermost position thereby to close the seat 44 and prevent fluid flow from port 22 through passage 40 to tank thereby directing the full flow available through port 32 into port 24.

The pressure differential between ports 36 and 38 is varied by the tapered, stepped, curved or otherwise contoured portions 53 and 54 of the valve spool 50 which are effective to control the opening between ports 36 and 34 and 36 and 38, respectively. The pressure differential between the supply port and the selected load port 24 is thus determined by the displacement of valve spool 50 from its neutral position. By moving valve spool 50 in the opposite direction to arrow 124, fluid flow is of course directed to load port 20.

It will be noted that in the valve according to this invention there is no large dead spot in the neutral position since in the present invention at the neutral position all fluid passes to tank via the flow control valve whereas with conventional open center directional control fluid valves all the fluid must pass through the neutral opening of the valve spool. Because of the extremely small neutral possible with this valve and the slow speed of the load as the valve spool 50 leaves or approaches neutral, the load can be positioned very accurately and smoothly and this eliminates undesirable hunting in applications where the valve is used as a servo valve.

It will also be seen from the foregoing therefore that in the valve of this invention, movement of a single element, i.e. lever 74, is effective to control both the direction of flow as well as the volume of flow and this regardless of the load or pressure changes therein. Thus, the instant valve in combination with a constant volume pump has similar characteristics to an expensive reversible variable delivery pump with the added advantage that the control is effected close to the operator and not at the pump which is usually remotely situated from the operator. Furthermore, in addition to keeping the load speed constant with a varying load by maintaining the spool 50 in a predetermined position, this valve enables the selected load speed to be maintained at a constant predetermined value regardless of variations in the pump delivery volume, always provided that the pump volume is as large or larger than the flow to the load.

What I claim as my invention is:

1. A fluid flow metering and directional control valve comprising a housing formed with a horizontal valve cylinder having a pair of longitudinally spaced load ports and a supply port intermediate said load ports for connection to a high pressure fluid source; a vertical chamber opening at one end into said cylinder and provided at its other end with spaced apart flow passages; a seat surrounding said chamber opening; a return port communicating with said vertical chamber; a piston slidably mounted in said vertical chamber and movable towards and away from said seat, said piston having equal effective surfaces on opposite sides thereof, said piston being operable to control the rate of fluid flow to the load; means normally biasing said piston towards said seat; a horizontal passage communicating with said vertical chamber through said spaced apart flow passages; a shuttle valve element mounted for sliding movement in said horizontal passage and adapted to open and close said flow passages; passage means connecting said horizontal passage to each of said cylinder load ports; and a valve spool mounted in said cylinder, said spool being adapted in the neutral position of the valve to close said load ports to the supply port thereby to direct fluid from said supply port to the return port and movable axially of said cylinder selectively to connect either of said load ports to said supply port thereby to direct fluid from said supply port to the selected load port and through the associated passage means to move said shuttle valve element axially of said horizontal passage to open one and close the other of said flow passages thereby to allow fluid into said chamber above said piston, said piston being responsive to changes in the pressure difference between the selected load port and the supply port as determined by the amount of the displacement of the valve spool from its neutral position thereby to maintain a substantially constant rate of fluid flow to the selected load port regardless of load pressure.

2. A fluid flow metering and directional control valve comprising a housing formed with a horizontal valve cylinder having a pair of longitudinally spaced load ports and a supply port intermediate said load ports for connection to a high pressure fluid source; a vertical chamber opening at one end into said cylinder and provided at its other end with spaced apart flow passages; a seat surrounding said chamber opening, a return port communicating with said vertical chamber; a piston slidably mounted in said vertical chamber and movable towards and away from said seat, said piston having equal effective surfaces on opposite sides thereof, said piston being operable to control the rate of fluid flow to the load; means normally biasing said piston towards said seat; a horizontal passage communicating with said vertical chamber through said spaced apart flow passages; a free shuttle valve mounted for sliding movement in said horizontal passage and normally partially closing said flow passages, said shuttle valve being movable towards either end of the horizontal passage to uncover one flow passage and close the other flow passage, passage means connecting the ends of the horizontal passage respectively to said cylinder load ports; and a spool valve slidably mounted in said cylinder and having spaced apart valve elements thereon, said spool being adapted in the neutral position of the valve to close said load ports to the supply port thereby to direct fluid from said supply port to the return port and movable axially of said cylinder selectively to connect either of said load ports to said supply port thereby to direct fluid from said supply port to the selected load port and through the associated passage means to move said shuttle valve element axially of said horizontal passage to open one and close the other of said flow passages thereby to allow fluid into said chamber above said piston, said piston being responsive to changes in the pressure difference between the selected load port and the supply port as determined by the amount of the displacement of the valve spool from its neutral position thereby to maintain a substantially constant rate of fluid flow to the selected load port regardless of changes in the load pressure.

3. A fluid flow metering and directional control valve as claimed in claim 2 in which the valve elements of the spool valve taper inwardly towards each other.

4. A fluid flow metering and directional control valve as claimed in claim 2 including equalizing passage means connecting to the chamber beneath the piston each of said passage means extending between the horizontal passage and each cylinder load port.

5. A fluid flow metering and directional control valve as claimed in claim 4 in which the spool valve elements are located to almost close both equalizing passage means when the valve spool is in the neutral position and to open the equalizing passage means of the passage means connected to one load port when the valve spool is moved to connect the other load port to the supply port and simultaneously to close the equalizing passage means of the passage means connected to the last-mentioned load port.

6. A fluid flow metering and directional control valve comprising a housing formed with a valve cylinder having a pair of longitudinally spaced load ports and a supply port intermediate said load ports for connection to a high pressure fluid source, a chamber at said cylinder and having an inlet port at an inner end thereof opening into the cylinder intermediate the load ports, a seat in the chamber surrounding the inlet port thereof, a return port in the chamber near said inner end thereof, a piston slidably mounted in said chamber and movable towards and away from said seat to close and open the inlet port, said piston having equal effective surfaces on opposite sides thereof, said piston being operable to control the rate of fluid flow to the load, means normally biasing the piston towards the seat, said chamber having spaced-apart flow passages at outer end thereof, a shuttle passage communicating with the chamber through said flow passages, a shuttle valve mounted for sliding movement in the shuttle passage and adapted to open and close said flow passages, said shuttle valve being of such length as normally partially to close both flow passages, passage means connecting opposite ends of the shuttle passage to the cylinder load ports, and a valve spool mounted in said cylinder, said spool being adapted in the neutral position of the valve to close said load ports to the supply port thereby to direct fluid from the supply port through the chamber inlet port to the return port and movable axially to the cylinder selectively to connect either of said load ports to said supply port thereby to direct fluid from said supply port to the selected load port and through the associated passage means to move the shuttle valve axially of the shuttle passage to open one and close the other of said flow passages thereby to allow fluid into said chamber above said piston, said piston being responsive to changes in the pressure differences between the selected load port and the supply port as determined by the amount of the displacement of the valve spool from its neutral position thereby to maintain a substantially constant rate of fluid flow to the selected load port regardless of load pressure for a selected position of the spool valve.

7. A fluid flow metering and directional control valve as claimed in claim 6 including a by-pass passage extending from the passage means of each end of the shuttle passage through the cylinder to the return port at said chamber, each by-pass passage being partially closed by the valve spool when the latter is in the neutral position, and one of said by-pass passages being closed by the valve spool when said spool is moved to bring the passage means of said one by-pass passage into communication with the supply port.

8. A fluid flow metering and directional control valve as claimed in claim 7 in which each by-pass passage is connected to a load port when the valve spool is in the neutral position, and one of said by-pass passages is cut off from its load port when the valve spool is shifted to bring the load port of said one by-pass passage into communication with the supply port.

9. A fluid flow metering and directional control valve as claimed in claim 6 in which the valve spool is formed with spaced-apart valve elements thereon which cut off the load ports from the supply port when the spool is in the neutral position, said valve elements tapering inwardly towards each other.

10. A fluid flow metering and directional control valve comprising a housing formed with a valve cylinder having a pair of longitudinally spaced load ports and a supply port intermediate said load ports for connection to a high pressure fluid source, said cylinder having a return port intermediate the load ports, an adjustable flow control element adapted to open and close the return port and biased to close said return port, said control element having first and second opposed and equally effective operating surfaces, separate passage means extending from each load port to the first surface of said control element to direct fluid from said load port to said first surface to move the element towards the return port closing position, the second surface of the control element being exposed to fluid at the supply port, control means in and common to both of said passage means adapted partially to close both passage means and movable by fluid in either passage means to shut off the other passage means, a by-pass passage extending from each of said passage means through the cylinder and to the return port, and a valve spool mounted in the cylinder and having a neutral position closing off both load ports from the supply port and connecting each by-pass passage to a load port, said valve spool being movable axially of said cylinder for selectively connecting the supply port to one of said load ports and to the passage means of said selected load port, and to close the by-pass passage of the latter passage means to cut off said selected load port from the return port, said flow control element being responsive to changes in the pressure difference between the selected load port and the supply port as determined by the amount of displacement of the valve spool from its neutral position thereby to maintain a substantially constant rate of fluid flow to the selected load port regardless of load pressure.

11. A fluid flow metering and directional control valve as claimed in claim 10 in which the valve spool is formed with spaced-apart valve elements thereon which cut off the load ports from the supply port when the spool is in the neutral position, said valve elements tapering inwardly towards each other to gradually connect the supply port to the selected load port during movement of the valve spool.

References Cited in the file of this patent

UNITED STATES PATENTS

| 2,503,870 | Harrington | Apr. 11, 1950 |
| 2,755,624 | Klessig et al. | July 24, 1956 |
| 2,869,567 | Carlson | Jan. 20, 1959 |
| 2,994,345 | Strader | Aug. 1, 1961 |
| 2,994,346 | Ruhl | Aug. 1, 1961 |
| 3,020,892 | Arbogast | Feb. 13, 1962 |

FOREIGN PATENTS

| 718,980 | Great Britain | Nov. 24, 1954 |